(12) United States Patent
Kawakami et al.

(10) Patent No.: US 7,605,552 B2
(45) Date of Patent: Oct. 20, 2009

(54) CONTROL APPARATUS FOR ELECTRIC VEHICLES

(75) Inventors: Keiichi Kawakami, Anjo (JP); Tsuneyuki Egami, Gamagori (JP); Takashi Ogawa, Kariya (JP)

(73) Assignee: Denso Corporation, Kariya (JP)

( * ) Notice: Subject to any disclaimer, the term of this patent is extended or adjusted under 35 U.S.C. 154(b) by 345 days.

(21) Appl. No.: 11/819,398

(22) Filed: Jun. 27, 2007

(65) Prior Publication Data

US 2008/0012512 A1    Jan. 17, 2008

(30) Foreign Application Priority Data

Jul. 13, 2006  (JP)  ............................. 2006-192522
Nov. 15, 2006  (JP)  ............................. 2006-309078

(51) Int. Cl.
    *H02P 25/30*    (2006.01)
(52) U.S. Cl. ........................ 318/148; 318/143; 318/432
(58) Field of Classification Search ................ 318/143, 318/148, 432, 434
    See application file for complete search history.

(56) References Cited

U.S. PATENT DOCUMENTS

| | | | |
|---|---|---|---|
| 7,099,756 B2 | 8/2006 | Sato | |
| 7,443,117 B2 * | 10/2008 | Egami et al. | 318/139 |
| 2006/0247829 A1 | 11/2006 | Sato | |
| 2007/0145927 A1 * | 6/2007 | Egami et al. | 318/432 |
| 2007/0194763 A1 * | 8/2007 | Egami et al. | 322/59 |
| 2007/0229009 A1 * | 10/2007 | Egami et al. | 318/432 |
| 2008/0012512 A1 * | 1/2008 | Kawakami et al. | 318/143 |
| 2008/0143286 A1 * | 6/2008 | Egami | 318/432 |
| 2008/0258656 A1 * | 10/2008 | Kawasaki et al. | 318/148 |

* cited by examiner

*Primary Examiner*—Paul Ip
(74) *Attorney, Agent, or Firm*—Nixon & Vanderhye P.C.

(57) ABSTRACT

A motor control unit executes a system voltage stabilization control for suppressing variation in a system voltage by operating reactive power of a motor/generator unit including an AC motor, and executes a conversion power control to control the output power of a voltage boosting converter to a command value. A target power operation amount necessary for stabilizing the system voltage is distributed to a motor/generator power operation amount command value and to a conversion power operation amount correction value. The target power operation amount can be obtained by being shared by the motor/generator unit and the voltage boosting converter, even when the target power operation amount is in excess of a limit value of power control amount of the motor/generator unit.

13 Claims, 10 Drawing Sheets

CONTROL APPARATUS FOR ELECTRIC VEHICLES

CROSS REFERENCE TO RELATED APPLICATION

This application is based on and incorporates herein by reference Japanese Patent Applications No. 2006-192522 filed on Jul. 13, 2006 and No. 2006-309078 filed on Nov. 15, 2006.

FIELD OF THE INVENTION

The present invention relates to a control apparatus for an electric vehicle including a system for converting a voltage generated by a DC power supply into a system voltage by using a voltage converter and for driving an AC motor by applying the system voltage to the AC motor through an inverter.

BACKGROUND OF THE INVENTION

As disclosed in documents such as U.S. 2006/0052915A1 (JP 2004-274945A), in an electric vehicle having AC motors mounted therein to serve as a power source of the vehicle, the AC motors are each capable of serving as a motor for driving wheels of the vehicle as well as a motor driven by an engine to generate power. As the above system, a control apparatus for the electric vehicle includes a voltage boosting converter for raising a voltage generated by a DC power supply, which is implemented by a secondary battery, to a high DC voltage appearing on a power supply line connected to the AC motors through inverters. The inverters are capable of serving as a component for converting the raised DC voltage appearing on the power supply line into an AC voltage for driving one of the AC motors as well as a component for converting the AC voltage into a DC voltage supplied back or restored to the secondary battery through the voltage boosting converter, which lowers the level of the DC voltage.

In the above system, in order to stabilize the voltage appearing on the power supply line, the voltage boosting converter controls the voltage appearing on the power supply line to a target voltage. Further, at the same time, a smoothing capacitor connected to the power supply line smoothes the voltage appearing on the power supply line.

When a relation between electric power driving one of the AC motors and electric power generated by the other AC motor considerably varies due to a change in vehicle operating state or another reason, however, voltage variations caused by a change in such relation as voltage variations of the power supply line cannot be absorbed by the voltage boosting converter and/or the smoothing capacitor. Thus, the voltage appearing on the power supply line becomes excessively high. As a result, it is likely that electronic equipment connected to the power supply line is damaged. In order to cope with this problem, there is provided a method for enhancing the effect of stabilizing the voltage appearing on the power supply line by using an improved voltage boosting converter with better performance and a smoothing capacitor with a larger capacitance. By adoption of this method, however, the voltage boosting converter with better performance and the smoothing capacitor with a larger capacitance will inevitably raise the cost of the control apparatus for an electric vehicle. Thus, demands for a system having a small size and a low cost cannot be met. The above relation between the power driving one of the AC motors and the power generated by the other AC motor is also referred to as a balance of power between the power driving one of the AC motors and the power generated by the other AC motor.

It is proposed for controlling the inverter to make a sum of energies (or balance of electric power) of the two AC motors equal to 0 at the time the connection between the DC power supply and the voltage boosting converter is cut off by using a relay in the event of a failure occurring in the DC power supply. However, this method is provided as a countermeasure to a failure occurring in the DC power supply and is capable of enhancing the effect of stabilizing the voltage appearing on the power supply line in a normal state of the power supply. In addition, even if an attempt is made to control the inverter to make the sum of energies (or the balance of power) of the two AC motors equal to 0 in a normal state, it is difficult to control the inverter to make the sum of energies (or the balance of power) of the two AC motors equal to 0 in the following cases.

In the first place, one of the AC motors is linked to a driving shaft of the electric vehicle and the other AC motor is linked to an output shaft of the internal combustion engine, that is, the two AC motors are linked to members having different operations. In the second place, the effect of a processing delay of the control executed on the inverter becomes larger, for example, during a transient state in which the operating state of the electric vehicle changes. The AC motor linked to the internal combustion engine is not capable of obviating power variations caused by changes of a torque generated by the internal combustion engine. This fact makes it even more difficult to control the inverter to make the sum of energies of the two AC motors equal to 0.

SUMMARY OF THE INVENTION

It is thus an object of the present invention to improve a control apparatus for electric vehicles to be capable of stabilizing a voltage appearing on a power supply line in small size and low cost.

A control apparatus for an electric vehicle has a conversion unit that converts a voltage of a DC power supply into a system voltage of a power supply line, and an MG unit that includes an inverter connected to the power supply line and an AC motor driven by the inverter. The control apparatus further includes a system voltage control unit, a current control unit, conversion voltage control unit, and a selection unit. The system voltage control unit executes a system voltage stabilization control to suppress variation in the system voltage by operating an electric power supplied to the power supply line. The current control unit controls a torque of the AC motor and an electric input power to the MG unit independently from each other. The conversion power control unit executes a conversion power control to control the electric input power to the conversion unit or a conversion power as an output power of the conversion unit. The conversion voltage control unit executes a conversion voltage control to control an output voltage from the conversion unit. The selection unit selects one of the conversion power control and the conversion voltage control, and inhibits the system voltage stabilization control when the conversion voltage control is selected.

The system voltage control unit includes a target power operation amount calculation unit that calculates a target power operation amount as a target operation amount of the electric power supplied to the power supply line, and a distribution unit that distributes the target power operation amount to an MG power operation amount command value for controlling the MG unit and to a conversion power operation amount correction value for controlling the conversion power. The conversion power control unit controls the conversion power based on the conversion power operation amount correction value, and wherein the current control unit controls the MG unit based on the MG power operation amount command value.

BRIEF DESCRIPTION OF THE DRAWINGS

The above and other objects, features and advantages of the present invention will become apparent from the following detailed description made with reference to the accompanying drawings. In the drawings.

DETAILED DESCRIPTION OF THE PREFERRED EMBODIMENT

Figure 1:
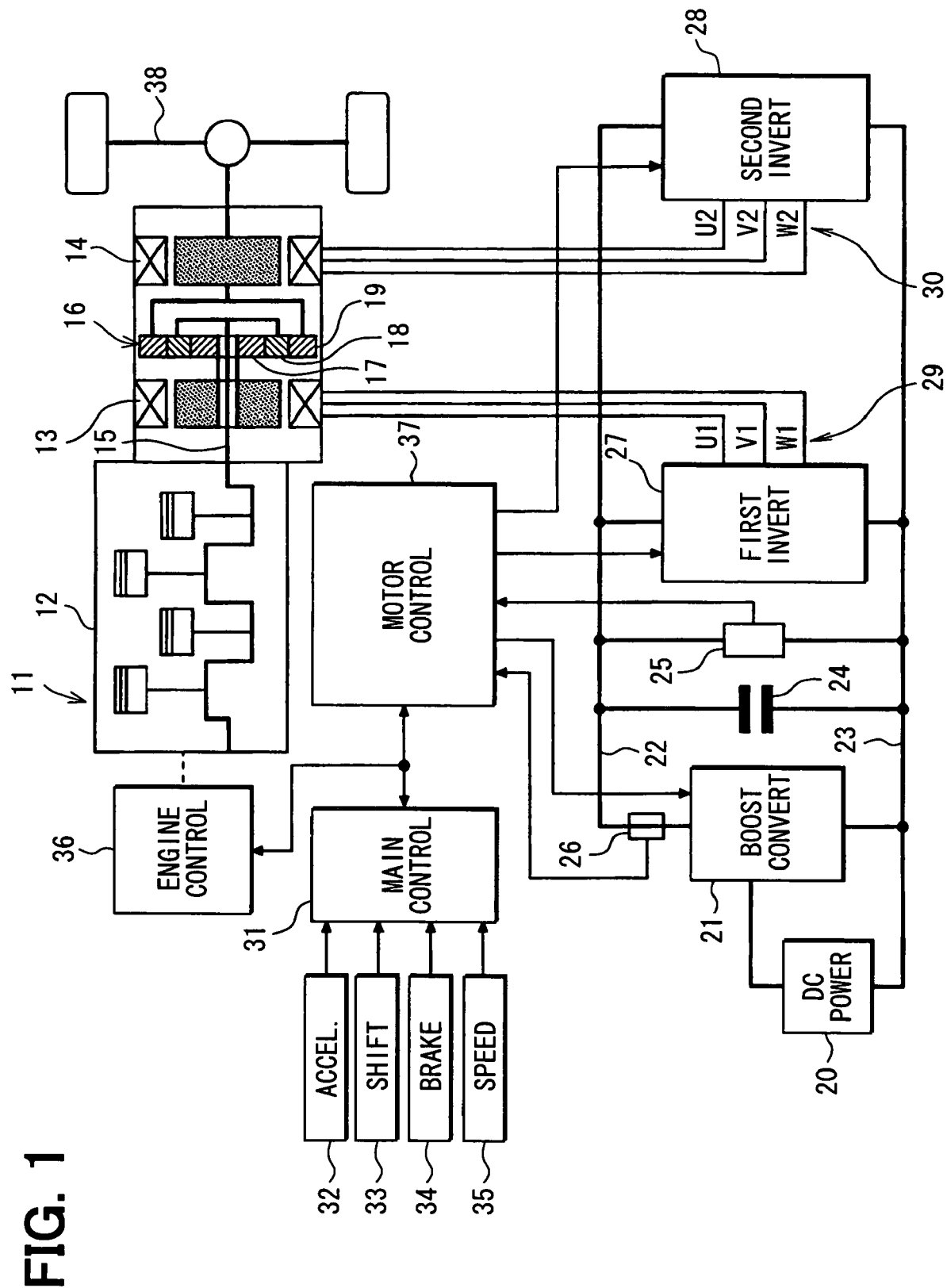
FIG. 1 is a block diagram schematically illustrating a drive system for an electric vehicle according to an embodiment of the present invention.

Referring first to FIG. 1, an electric vehicle 11 has an internal combustion engine 12 in addition to a first AC motor 13 and a second AC motor 14. Thus, the electric vehicle 11 is an engine/motor hybrid vehicle. The engine 12 and the second AC motor 14 are employed as a drive power source for driving the electric vehicle 11. Power generated by a crankshaft 15 of the engine 12 is divided into two paths by a planetary gear set 16. The planetary gear set 16 includes a sun gear 17, a planetary gear 18 and a ring gear 19. The sun gear 17 rotates at its radial center. The planetary gear 18 rotates along a circumference external to the sun gear 17 while revolving around its radial center. The ring gear 19 rotates along a circumference external to the planetary gear 18. The planetary gear 18 is linked to the crankshaft 15 of the engine 12 through a carrier (not shown). On the other hand, the ring gear 19 is linked to a rotation shaft of the second AC motor 14. The sun gear 17 is linked to the first AC motor 13.

A secondary battery serving as a DC power supply 20 is connected to a voltage boosting converter 21 serving as a power conversion means. The voltage boosting converter 21 is a component having a function of increasing a DC voltage output by the DC power supply 20 in order to generate a DC system voltage supplied between a power supply line 22 and a ground line 23 as well as a function of decreasing the system voltage in order to return or restore power to the DC power supply 20. A smoothing capacitor 24 for smoothing the system voltage and a voltage sensor 25 serving as a voltage detection means for detecting the system voltage are connected between the power supply line 22 and the ground line 23. A current sensor 26 serving as a current detection means is placed on the power supply line 22 as a means for detecting a current flowing through the power supply line 22.

In addition, a first three-phase inverter 27 and a second three-phase inverter 28 are also connected between the power supply line 22 and the ground line 23. The first three-phase inverter 27 and the second three-phase inverter 28 are each a three-phase inverter of a voltage control type. The first three-phase inverter 27 drives the first AC motor 13, whereas the second three-phase inverter 28 drives the second AC motor 14. The first three-phase inverter 27 and the first AC motor 13 form a first motor driving unit 29, which operates as a first motor/generator (MG) unit 29. Similarly, the second three-phase inverter 28 and the second AC motor 14 form a second motor driving unit 30, which operates as a second motor/generator (MG) unit 30.

A main control unit 31 is a computer for executing overall control on the electric vehicle as a whole. The main control unit 31 acquires signals output by a variety of sensors and switches in order to detect an operating state of the electric vehicle. The sensors and the switches include an accelerator sensor 32, a shift switch 33, a brake switch 34 and a vehicle speed sensor 35. The accelerator sensor 32 is a sensor for detecting an accelerator operation amount representing an operation amount of an acceleration pedal. The shift switch 33 is a sensor for detecting gear shift position of the electric vehicle. The gear shift position can be a parking position (P), a rear driving position (R), a neutral position (N) or a forward driving position (D). The brake switch 34 is a switch for detecting a braking operation. The vehicle speed sensor 35 is a sensor for detecting a value of the travel speed of the electric vehicle. The main control unit 31 exchanges control and data signals with an engine control unit 36 and a motor control unit 37, driving the engine control unit 36 and the motor control unit 37 to control the engine 12, the first AC motor 13 and the second AC motor 14 in accordance with the operating state of the electric vehicle. The engine control unit 36 is for controlling the operation of the engine 12, whereas the motor control unit 37 is for controlling the operations of the first AC motor 13 and the second AC motor 14.

Figure 2:
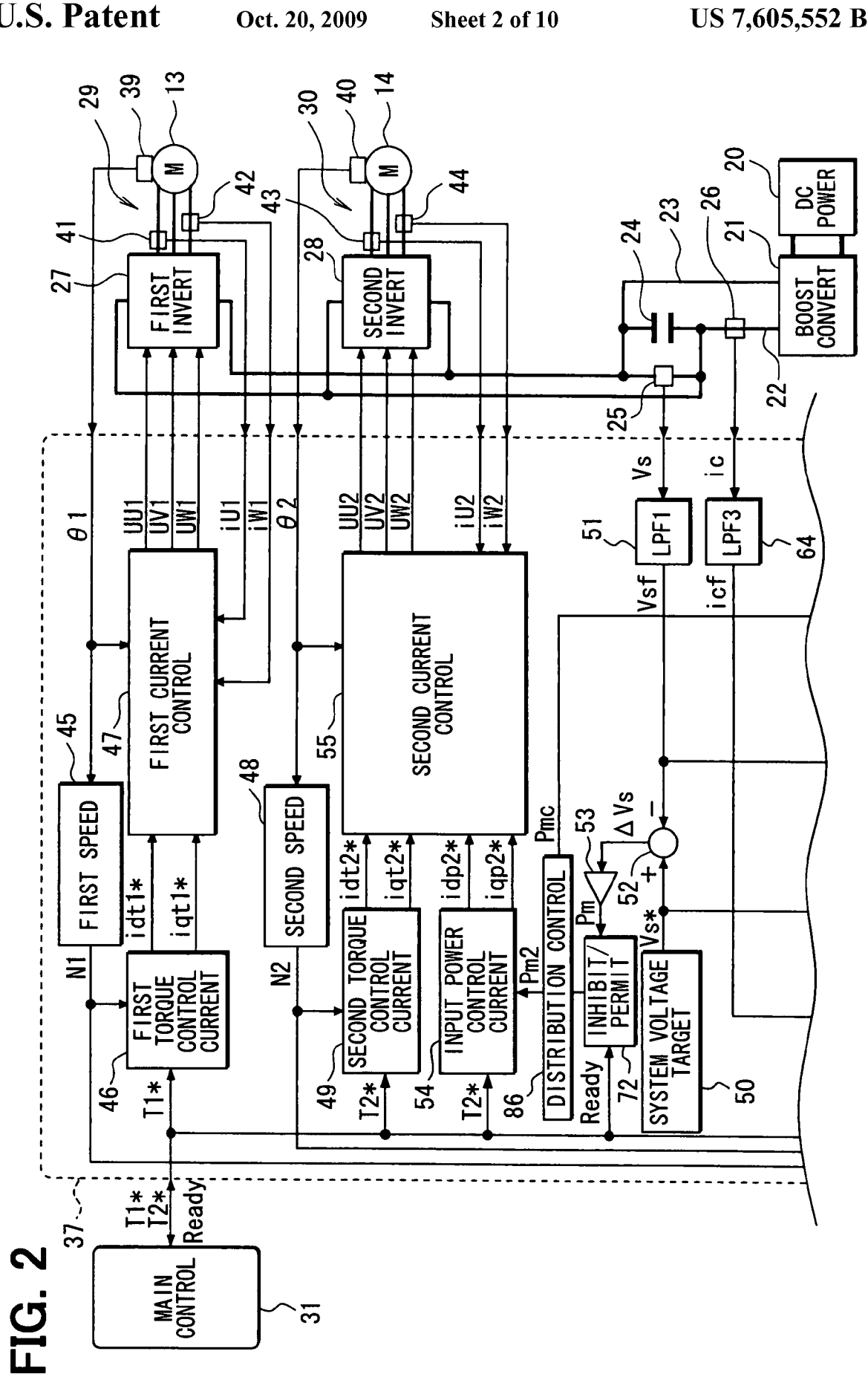
FIG. 2 is a block diagram illustrating a motor control system and peripheral portions thereof.
Figure 3:
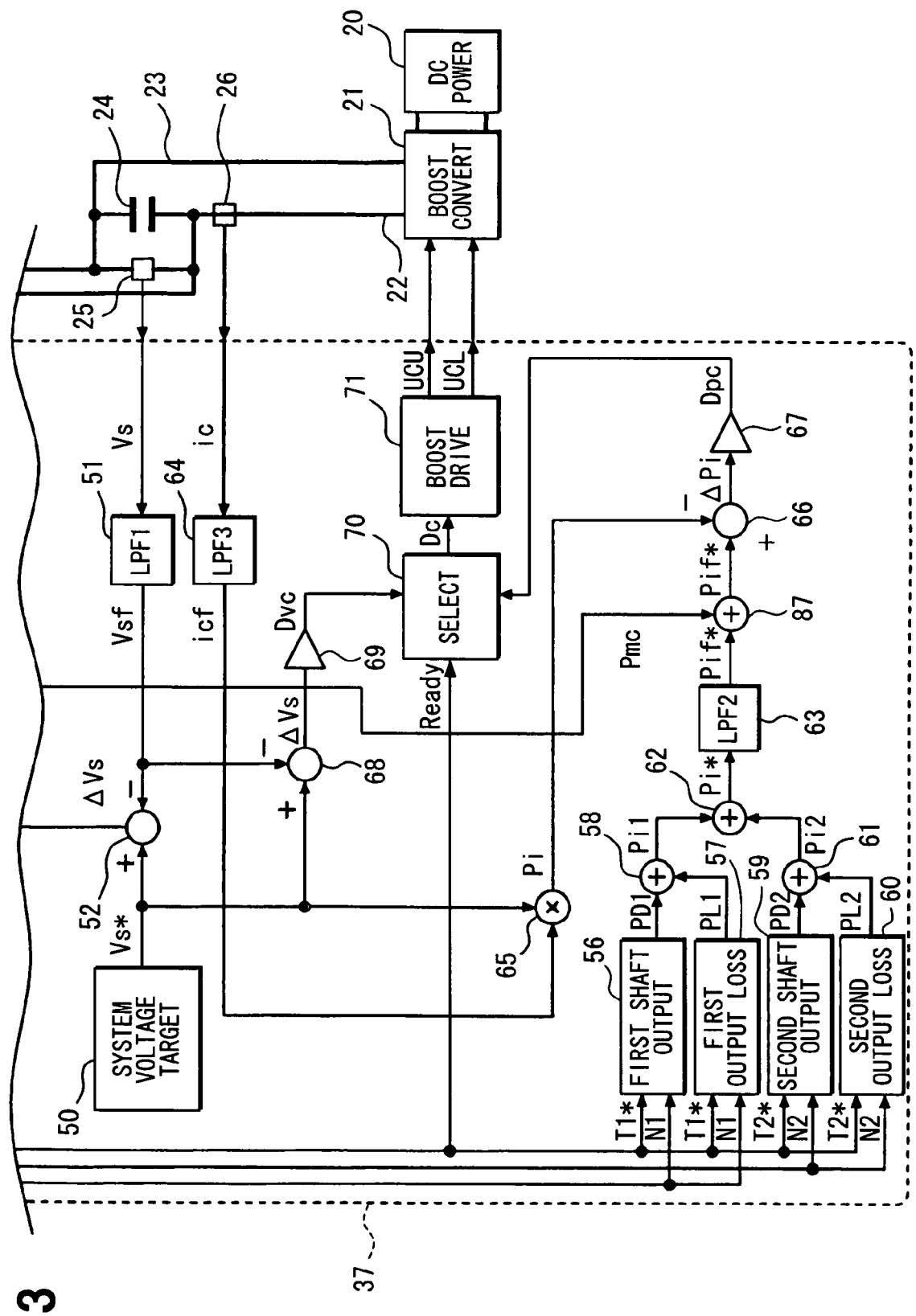
FIG. 3 is a block diagram illustrating a voltage boosting converter control system and peripheral portions thereof.

Next, control of the first AC motor 13 and the second AC motor 14 is described by referring to FIGS. 2 and 3. The first AC motor 13 and the second AC motor 14 are each a three-phase permanent-magnet synchronous motor having a permanent magnet in its inside. The first AC motor 13 and the second AC motor 14 have respectively rotor rotational position sensors 39 and 40 each used for detecting the rotational position of the rotor of the motor. Based on three-phase voltage command signals UU1, UV1 and UW1 output by the motor control unit 37, the first inverter 27 of the voltage control type converts the DC system voltage appearing on the power supply line 22 into three-phase AC voltages U1, V1 and W1 for driving the first AC motor 13. The DC system voltage appearing on the power supply line 22 is generated by the voltage boosting converter 21. A U-phase current sensor 41 is a sensor for detecting a U-phase current iU1 of the first AC motor 13, whereas a W-phase current sensor 42 is a sensor for detecting a W-phase current iW1 of the first AC motor 13.

Similarly, based on three-phase voltage command signals UU2, UV2 and UW2 output by the motor control unit 37, the second three-phase inverter 28 of the voltage control type converts the DC system voltage appearing on the power supply line 22 into three-phase AC voltages U2, V2 and W2 for driving the second AC motor 14. A U-phase current sensor 43 is a sensor for detecting a U-phase current iU2 of the second AC motor 14, whereas a W-phase current sensor 44 is a sensor for detecting a W-phase current iW2 of the second AC motor 14.

It is to be noted that the first AC motor 13 and the second AC motor 14 each also function as an electric power generator, when the first AC motor 13 and the second AC motor 14 are driven by the first three-phase inverter 27 and the second three-phase inverter 28 respectively to generate a negative torque. For example, when the electric vehicle 11 is being decelerated, AC power generated by the second AC motor 14 as deceleration energy is converted into DC power by the second three-phase inverter 28 and the DC power is accumulated back in the DC power supply 20. Normally, a portion of power of the engine 12 is transferred to the first AC motor 13 by way of the planetary gear 18, causing the first AC motor 13 to operate as a generator for generating electric power corresponding to the portion of the power of the engine 12. The electric power generated by the first AC motor 13 is supplied to the second AC motor 14, causing the second AC motor 14 to operate as a motor. The power of the engine 12 is divided into two paths by the planetary gear set 16. When a torque applied to the ring gear 19 of the planetary gear set 16 is greater than a torque required by a running operation of the electric vehicle, the first AC motor 13 functions as a motor, drawing power of the engine 12. In this case, the second AC motor 14 functions as a generator generating power to be supplied to the first AC motor 13.

At the start of operating the vehicle drive system (at the operation start of the main control unit 31 or the motor control unit 37), the motor control system is in a state of being shut down (motor control and the like have been halted) and almost no electric charge has been accumulated in the smoothing capacitor 24. Prior to starting the motor control, therefore, it is necessary to pre-charge the smoothing capacitor 24 to elevate the system voltage up to a target value.

Therefore, the motor control unit 37 executes a main motor control program shown in of FIG. 11 that will be described later. That is, right after the start of system operation but before the smoothing capacitor 24 has been sufficiently pre-charged, the motor control unit 37 selectively executes the conversion voltage control to control the output voltage of the voltage boosting converter 21 so that the system voltage is quickly brought into agreement with the target value. While the conversion voltage control is being executed, a power command value (target power operation amount Pm) for the system voltage stabilization control that will be described later is inhibited from being output to the power control system (power operation amount distribution controller 86) to inhibit the execution of the system voltage stabilization control. After the smoothing capacitor 24 has been pre-charged, a pre-charge completion signal is transmitted to the main control unit 31.

When it is so determined based on the pre-charge completion signal and other signals that the motor control system may be released from the shut-down state, the main control unit 31 transmits a ready signal to the motor control unit 37.

Upon receipt of the ready signal, the motor control unit 37 resets or releases the shut-down of the motor control system, executes the motor control, stops the conversion voltage control, and changes the control over to the conversion power control to control the output power of the voltage boosting converter 21 so that the output power of the voltage boosting converter 21 is brought into agreement with the command value.

The motor control executes the torque control for controlling the torque of the first AC motor 13, executes the torque control for controlling the torque of the second AC motor 14, and executes the system voltage stabilization control for suppressing variation in the system voltage by operating the input electric power (reactive power) which is different from the electric power necessary for producing the torque of the second MG unit 30 (second AC motor 14). Here, the torque of the second AC motor 14 is controlled independently of controlling the input power to the second MG unit 30.

Figure 4:
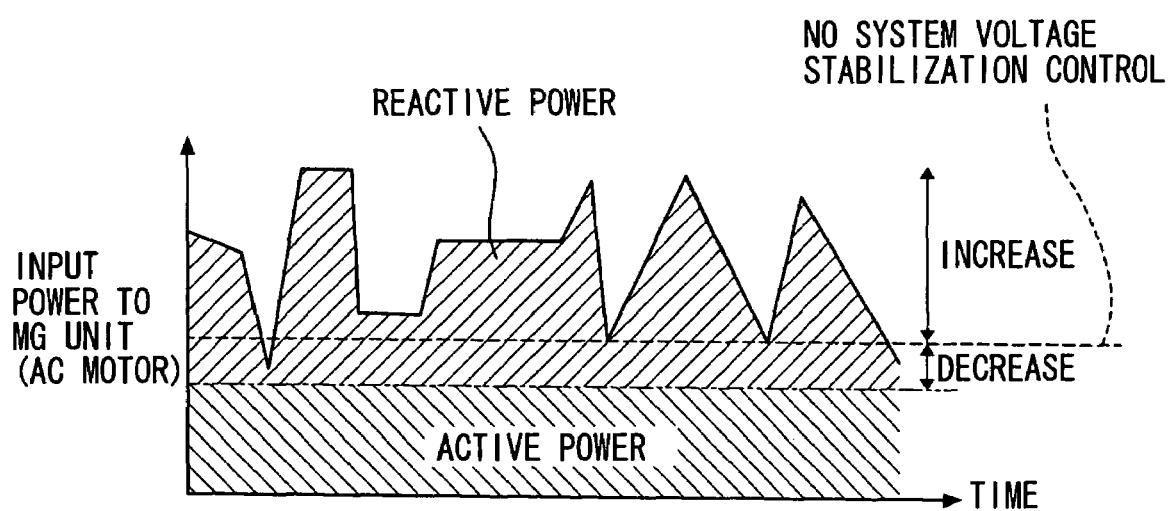
FIG. 4 is a time chart illustrating the characteristics of a system voltage stabilization control.

In executing the system voltage stabilization control, as shown in FIG. 4, when the system voltage is higher than a target value, the reactive power of the second MG unit 30 (second AC motor 14) is increased to pull the system voltage down to the target value. When the system voltage is lower than the target value, the reactive power of the second MG unit 30 (second AC motor 14) is decreased to pull the system voltage up to the target value to thereby stabilize the system voltage.

Normally, however, the second MG unit 30 (second AC motor 14) mounted on the vehicle is operated in an efficient region (i.e., in a region where the reactive power is small) for better fuel efficiency as represented by a broken line in FIG. 4. In executing the system voltage stabilization control, therefore, the reactive power operation amount (width of increase) can be relatively increased in the direction in which the reactive power increases, but the reactive power operation amount (width of decrease) cannot be so increased in the direction in which the reactive power decreases causing a decrease in the limit value of the reactive power operation amount that can be operated (maximum allowable operation amount is small in the direction in which the reactive power decreases). Therefore, if the target power operation amount exceeds the limit value (limit reactive power operation amount) of input power control for the second MG unit 30 while the system voltage is becoming smaller than the target value decreasing the reactive power of the second MG unit 30, the second MG unit 30 is no longer capable of realizing the target power operation amount necessary for stabilizing the system voltage. It becomes probable that the system voltage cannot be fully stabilized, that is, the system voltage cannot be quickly suppressed from becoming very small.

Therefore, the motor control unit 37 distributes the target power operation amount in the system voltage stabilization control to an MG power operation amount command value for controlling the second MG unit 30 and to a conversion power operation amount correction value for controlling the conversion power. The motor control unit 37 controls the conversion power by using the conversion power operation amount correction value that is distributed, and controls the second MG unit 30 by using the MG power operation amount command value that is distributed. Therefore, even if the target power operation amount necessary for stabilizing the system voltage exceeds the limit value (limit reactive power operation amount) of the input power control for the second MG unit 30 at the time when the system voltage becomes smaller than the target value decreasing the reactive power of the second MG unit 30, the target power operation amount is attained by sharing by both the second MG unit 30 and the voltage boosting converter 21.

The motor control (torque control of the first AC motor 13, torque control of the second AC motor 14, system voltage stabilization control), the conversion voltage control and the conversion power control executed by the motor control unit 37 are described in detail below.

(Motor Control)

When the smoothing capacitor 24 has been sufficiently pre-charged, that is, pre-charging the smoothing capacitor 24 has been completed, after the activation of system operation, the motor control unit 37 releases the motor control system from the shut-down state and executes the motor control (torque control, system voltage stabilization control).

In execution of torque control on the first AC motor 13, as shown in FIG. 2, the motor control unit 37 generates the three-phase voltage command signals UU1, UV1 and UW1 by a sinusoidal-waveform PWM control method based on a torque command value T1* output by the main control unit 31, the U-phase current iU1 and W-phase current iW1 of the first AC motor 13 as well as the rotor rotational position θ1 of the first AC motor 13 as described below. The U-phase current iU1 and the W-phase current iW1 are signals output by the current sensors 41 and 42 respectively, whereas the rotor rotational position θ1 is a signal output by the rotor rotational position sensor 39.

The signal output by the rotor rotational position sensor 39 as a signal representing the rotor rotational position θ1 of the first AC motor 13 is supplied to a first rotation speed computation unit 45 for computing a first rotation speed N1 of the first AC motor 13. Then, in order to apply current feedback control to each of a d-axis current id1 and a q-axis current iq1 independently of each other in a d-q coordinate system set as a rotational coordinate system of the rotor of the first AC motor 13, a first torque control current computation unit 46 computes a torque control current vector it1* representing a d-axis torque control current idt1* and a q-axis torque control current iqt1* by using typically map data or a mathematical equation as a vector according to the torque command value T1* and the rotation speed N1 of the first AC motor 13.

Subsequently, a first current vector control unit 47 computes an actual current vector i1 (d-axis current id1 and the q-axis current iq1) based on the U-phase current iU1 and W-phase current iW1 of the first AC motor 13 as well as the rotor rotational position θ1 of the first AC motor 13 as described below. As described above, the U-phase current iU1 and the W-phase current iW1 are signals output by the current sensors 41 and 42 respectively, whereas the rotor rotational position θ1 is the signal output by the rotor rotational position sensor 39. Then, the first current vector control unit 47 computes a d-axis command voltage Vd1* by execution of P-I control for reducing a difference Δid1 between the d-axis torque control current idt1* and an actual d-axis current id1, and computes a q-axis command voltage Vq1* by execution of proportional-and-integral (P-I) control for reducing a difference Δiq1 between the q-axis torque control current iqt1* and an actual q-axis motor detection current iq1. Finally, the first current vector control unit 47 converts the d-axis command voltage Vd1* and the q-axis command voltage Vq1* into the three-phase PWM command signals UU1, UV1 and UW1, outputting the three-phase PWM command signals UU1, UV1 and UW1 to the first three-phase inverter 27.

Thus, the torque control for controlling the torque of the first AC motor 13 is executed to realize the torque command value T1* output by the main control unit 31.

In execution of torque control on the second AC motor 14, on the other hand, the motor control unit 37 generates the three-phase voltage command signals UU2, UV2 and UW2 by the sinusoidal-waveform PWM control method based on a torque command value T2* output by the main control unit 31, the U-phase current iU2 and W-phase current iW2 of the second AC motor 14 as well as the rotor rotational position θ2 of the second AC motor 14. As described below, the U-phase current iU1 and the W-phase current iW1 are signals output by the current sensors 43 and 44 respectively, whereas the rotor rotational position θ2 is a signal output by the rotor rotational position sensor 40.

At this time, control of stabilizing the system voltage is executed in order to suppress variations in the system voltage by adjusting an input power to the second MG unit 30 (second AC motor 14) while sustaining the torque generated by the second AC motor 14 at a constant value (torque command value T2*) through adjustment of a current vector so as to change only the input power (or reactive power) different from the power required for generation of the torque of the second AC motor 14.

Specifically, the signal output by the rotor rotational position sensor 40 as a signal representing the rotor rotational position θ2 of the second AC motor 14 is supplied to a second rotation speed computation unit 48 for computing a rotation speed N2 of the second AC motor 14. Then, in order to apply current feedback control to each of a d-axis current id2 and a q-axis current iq2 independently of each other in a d-q coordinate system set as a rotational coordinate system of the rotor of the second AC motor 14, a second torque control current computation unit 49 computes a torque control current vector it2* representing a d-axis torque control current idt2* and a q-axis torque control current iqt2* by using typically map data or a mathematical equation as a vector according to a torque command value T2* and rotation speed N2 of the second AC motor 14.

Then, a system voltage target value computation unit 50 serving as a target value computation means computes a target value Vs* of the system voltage, whereas the voltage sensor 25 supplies a detection value Vs of the system voltage to a first low pass filter 51 serving as a first low-frequency component passing means for carrying out a low pass filtering process to pass only components included in the detection value Vs of the system voltage as components each having a low frequency. Subsequently, a subtractor 52 computes a difference ΔVs between the target value Vs* of the system voltage and a detection value Vsf output by the low pass filtering process as the detection value of the system voltage, supplying the difference ΔVs to a P-I controller 53 serving as a power operation amount computation means for computing a target power operation amount Pm of the second AC motor 14 as a quantity that reduces the difference ΔVs between the target value Vs* of the system voltage and the detection value Vsf output by the low pass filtering process as the detection value of the system voltage by execution of P-I control.

The target power operation amount Pm is input to an inhibit/permit gate 72. Upon receipt of a ready signal from the main control unit 31, the target power operation amount Pm is permitted to be output to a power operation amount distribution controller 86. The power operation amount distribution controller 86 (distribution means) distributes the target power operation amount Pm to an MG power operation amount command value Pm2 and to a conversion power operation amount correction value Pmc in a manner as described below.

First, based on the data of the second MG unit 30 (torque command value T2* of the second AC motor 14, rotational speed N2, electric power that is consumed, temperature, etc.) and upon the data of the vehicle (vehicle speed, output shaft torque, etc.), a limit value of input power control for the second MG unit 30 (limit MG power control amount) Pm2 (max) is calculated by using a map or a mathematical equation, and a limit value of conversion power control (limit conversion power control amount) Pmc(max) is calculated by using a map or a mathematical equation.

The driving state and the generating state of the second AC motor 14 vary depending upon the state of the second MG unit 30 and upon the state of the vehicle, and the limit MG power control amount Pm2(max) and the limit conversion power control amount Pmc(max) vary correspondingly. Therefore, the limit MG power control amount Pm2(max) and the limit conversion power control amount Pmc(max) can be precisely set if the limit MG power control amount Pm2 (max) and the limit conversion power control amount Pmc (max) are calculated by using the data of the second MG unit 30 (torque command value T2* of the second AC motor 14, rotational speed N2, electric power that is consumed, temperature, etc.) and the data of the vehicle (vehicle speed, output shaft torque, etc.).

If the reactive power of the second AC motor 14 excessively increases, the temperature of the second AC motor 14 increases excessively, i.e., the second AC motor 14 will overheat. If the limit MG power control amount Pm2(max) is calculated by using the temperature (rotor temperature, etc.) of the second AC motor 14, it is possible to set the limit MG power control amount Pm2(max) in a range in which the second AC motor 14 is not over-heated.

Thereafter, the target power operation amount Pm is compared with the limit MG power control amount Pm2(max) and with the limit conversion electric power control amount Pmc(max).

Figure 5:
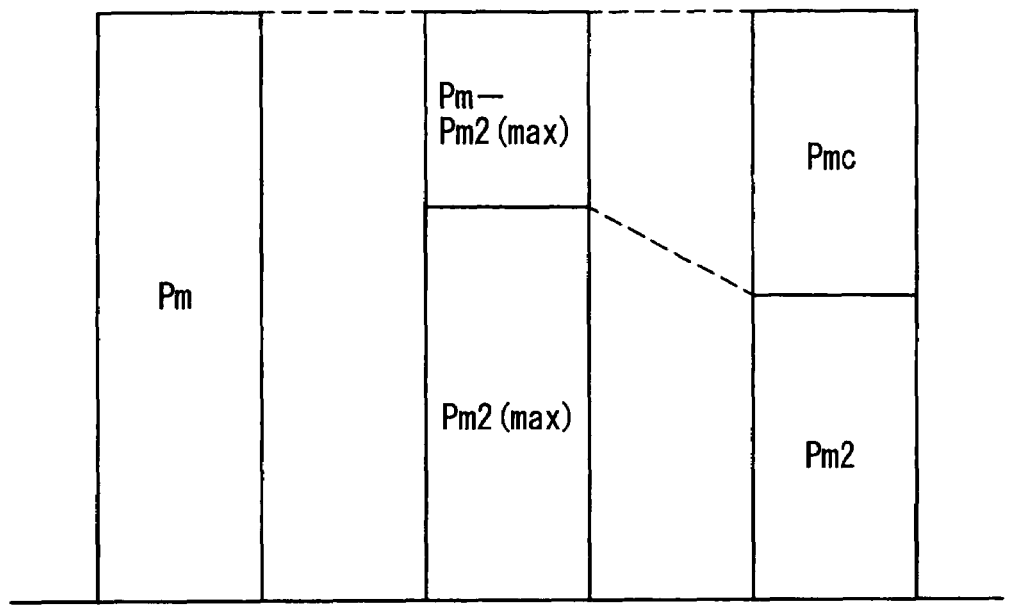
FIG. 5 is a graph illustrating a setting of an MG power operation amount command value Pm2 and a conversion power operation amount correction value Pmc of when a target power operation amount Pm has exceeded a limit MG power control amount Pm2(max)

As a result, as shown in FIG. 5, if the target power operation amount Pm exceeds the limit MG power control amount Pm2(max), an excess amount [Pm−Pm2(max)] of the target power operation amount Pm over the limit MG power control amount Pm2(max) or a value slightly greater than the above amount is set as the conversion power operation amount correction value Pmc, and a value (Pm−Pmc) obtained by subtracting the conversion power operation amount correction value Pmc from the target power operation amount Pm is set as the MG power operation amount command value Pm2.

$Pmc \geq Pm-Pm2(max)$ $Pm2=Pm-Pmc$

Thus, even when the target power operation amount Pm has exceeded the limit MG power control amount Pm2(max), the target power operation amount Pm is distributed to the MG power operation amount command value Pm2 and to the conversion power operation amount correction value Pmc so that the MG power operation amount command value Pm2 will not exceed the limit MG power control amount Pm2 (max).

Figure 6:
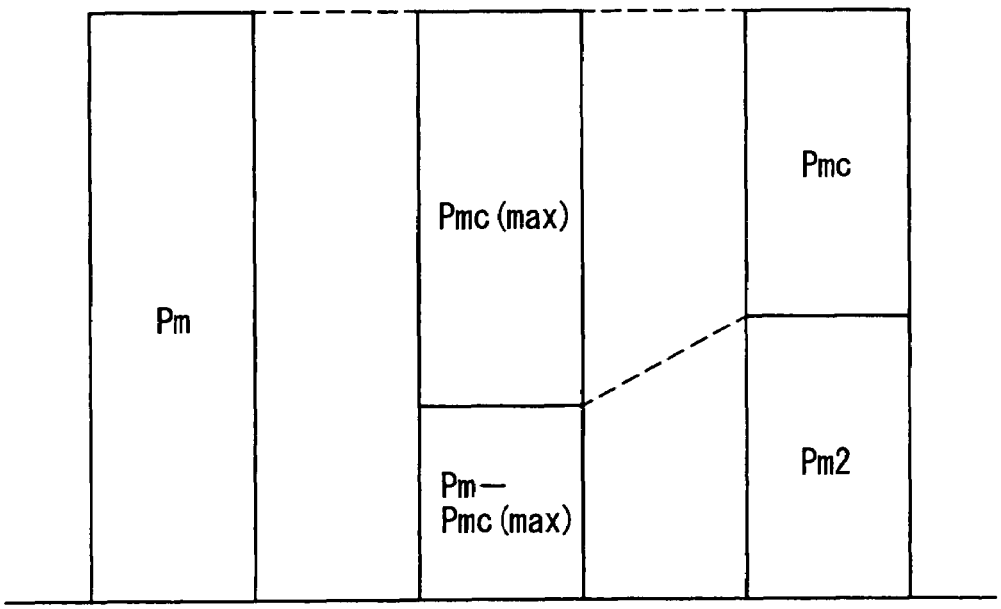
FIG. 6 is a graph illustrating a setting of an MG power operation amount command value Pm2 and a conversion power operation amount correction value Pmc of when a target power operation amount Pm has exceeded a limit conversion power control amount Pmc(max)

Referring to FIG. 6, on the other hand, if the target power operation amount Pm exceeds the limit conversion power control amount Pmc(max), an excess amount [Pm−Pmc (max)] of the target power operation amount Pm over the limit conversion power control amount Pmc(max) or a value slightly greater than the above amount is set as the MG power operation amount command value Pm2, and a value (Pm−Pm2) obtained by subtracting the MG power operation amount command value Pm2 from the target power operation amount Pm is set as the conversion power operation amount correction value Pmc.

$Pm2 \geq Pm-Pmc(max)$ $Pmc=Pm-Pm2$

Thus, even when the target power operation amount Pm has exceeded the limit conversion power control amount Pmc (max), the target power operation amount Pm is distributed to the MG power operation amount command value Pm2 and to the conversion power operation amount correction value Pmc so that the conversion power operation amount correction value Pmc will not exceed the limit conversion power control amount Pmc(max).

Figure 7A:
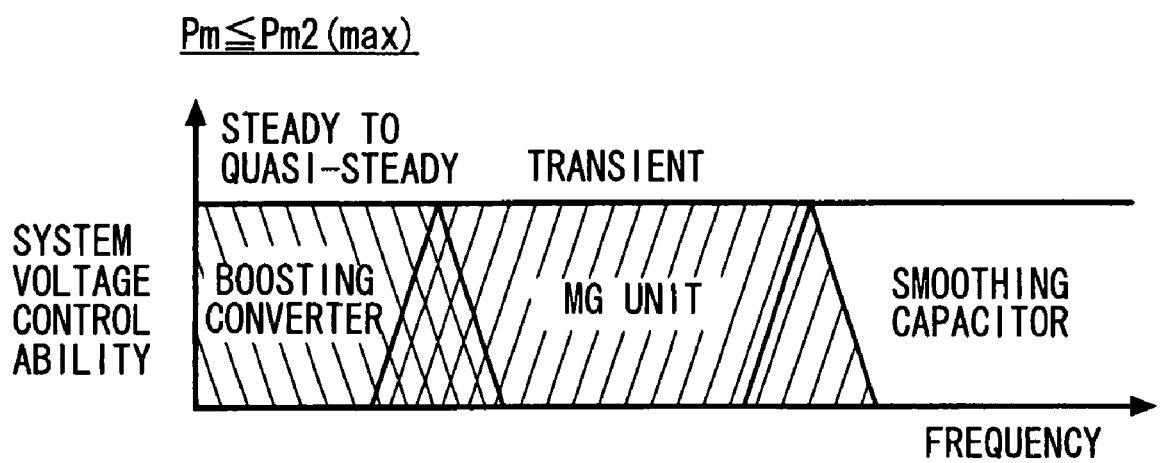
FIG. 7A is a diagram illustrating a system voltage control of when the target power operation amount Pm is not exceeding the limit MG power control amount Pm2(max)

Further, when the target power operation amount Pm is smaller than the limit MG power control amount Pm2(max) and is, further, smaller than the limit conversion power control amount Pmc(max), as shown in FIG. 7A, the conversion power operation amount correction value Pmc is so set as to suppress a change in the system voltage in the steady to quasi-steady state by controlling the conversion electric power (by controlling the system voltage by controlling the output electric power of the voltage boosting converter 21), and the MG power operation amount command value Pm2 is so set as to suppress a transient change in the system voltage on the side of higher frequencies by the system voltage stabilization control (by controlling the system voltage by operating the input electric power to the second MG unit 30).

Figure 7B:
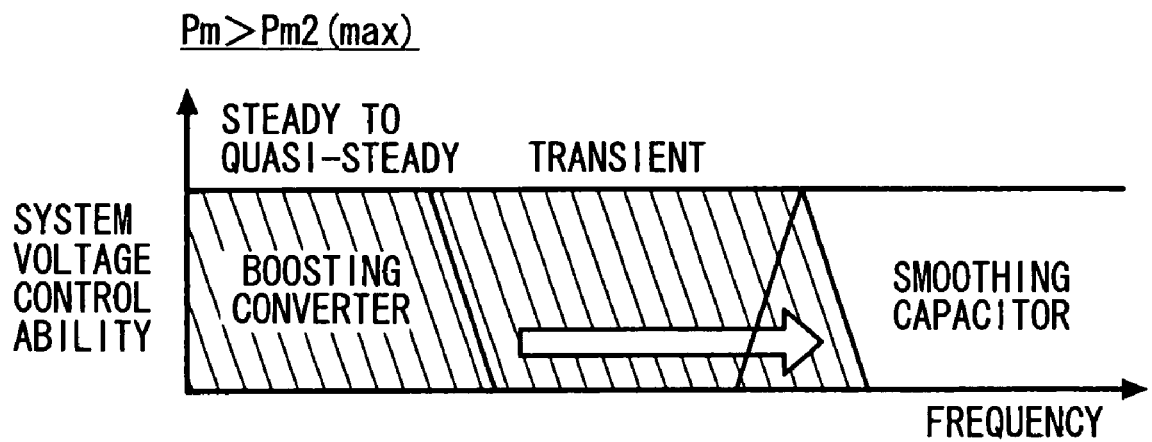
FIG. 7B is a diagram illustrating a system voltage control of when the target power operation amount Pm has exceeded the limit MG power control amount Pm2(max)

When the target power operation amount Pm exceeds the limit MG power control amount Pm2(max), the excess amount of power operation amount of the target power operation amount Pm over the limit MG power control amount Pm2(max) is alternatively operated by the conversion power control. As shown in FIG. 7B, therefore, the frequency band for suppressing a change in the system voltage expands toward the side of high frequencies based on the conversion power control (based on the control of the system voltage by controlling the output power of the voltage boosting converter 21). Therefore, a change in the system voltage is suppressed by the conversion electric power control even in the frequency band where a change in the system voltage had been suppressed based on the system voltage stabilization control (based on the control of the system voltage by operating the input power to the second MG unit 30).

Figure 8:
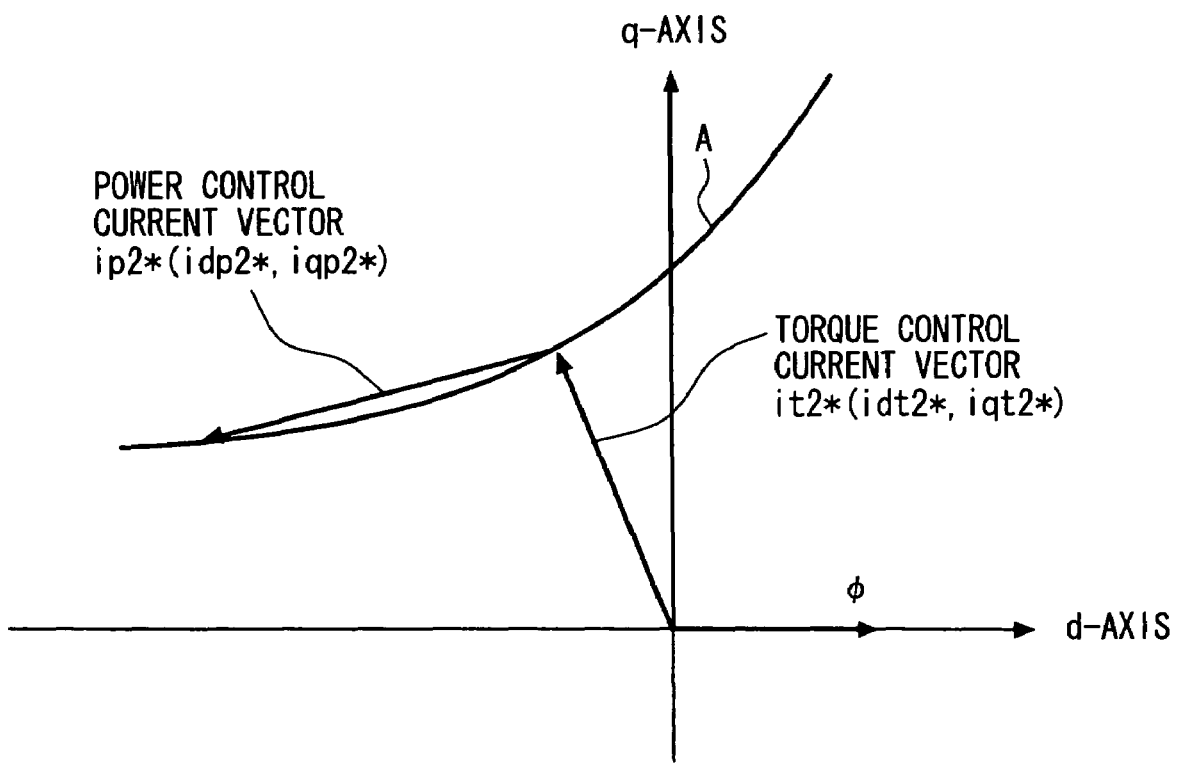
FIG. 8 is a diagram illustrating a method of operating an command current vector ip2* for controlling the input electric power.

Thus, the power operation amount distribution controller 86 distributes the target power operation amount Pm to the MG power operation amount command value Pm2 and to the conversion power operation amount correction value Pmc. Thereafter, it inputs the MG power operation amount command value Pm2 to the input power control current calculation unit 54. Thus, as shown in FIG. 8, a command current vector ip2*(d-axis command current idp2*, q-axis command current iqp2*) is found for controlling the input power in order to vary the reactive power that does not contribute to the production of the torque of the second AC motor 14 by the MG power operation amount command value Pm2 as described below.

First, the d-axis command current idp2* for controlling the input power which is dependent upon the MG power operation amount command value Pm2 and upon the command current vector it2*(d-axis command current idt2*, q-axis command current iqt2*) for controlling the torque, is calculated by using a map or a mathematical equation. The q-axis command current iqp2* for controlling the input power is calculated by using the d-axis command current idp2* for controlling the input electric power by using the following equation.

$$iqp2^* = [(Ld-Lq) \times idp2^* \times iqt2^*] / [(Ld-Lq) \times (idp2^* + idt2^*) + \phi]$$

where $\phi$ is an interlinking magnetic flux, Ld is a d-axis inductance and Lq is a q-axis inductance, which are apparatus constants of the AC motor 14.

Thus, the command current vector ip2* (d-axis command current idp2*, q-axis command current iqp2*) for controlling the input electric power is found to vary the power (reactive power) input to the second AC motor 14 by the MG power operation amount command value Pm2 while maintaining the torque of the second AC motor 14 nearly constant (torque command value T2*).

Figure 9:
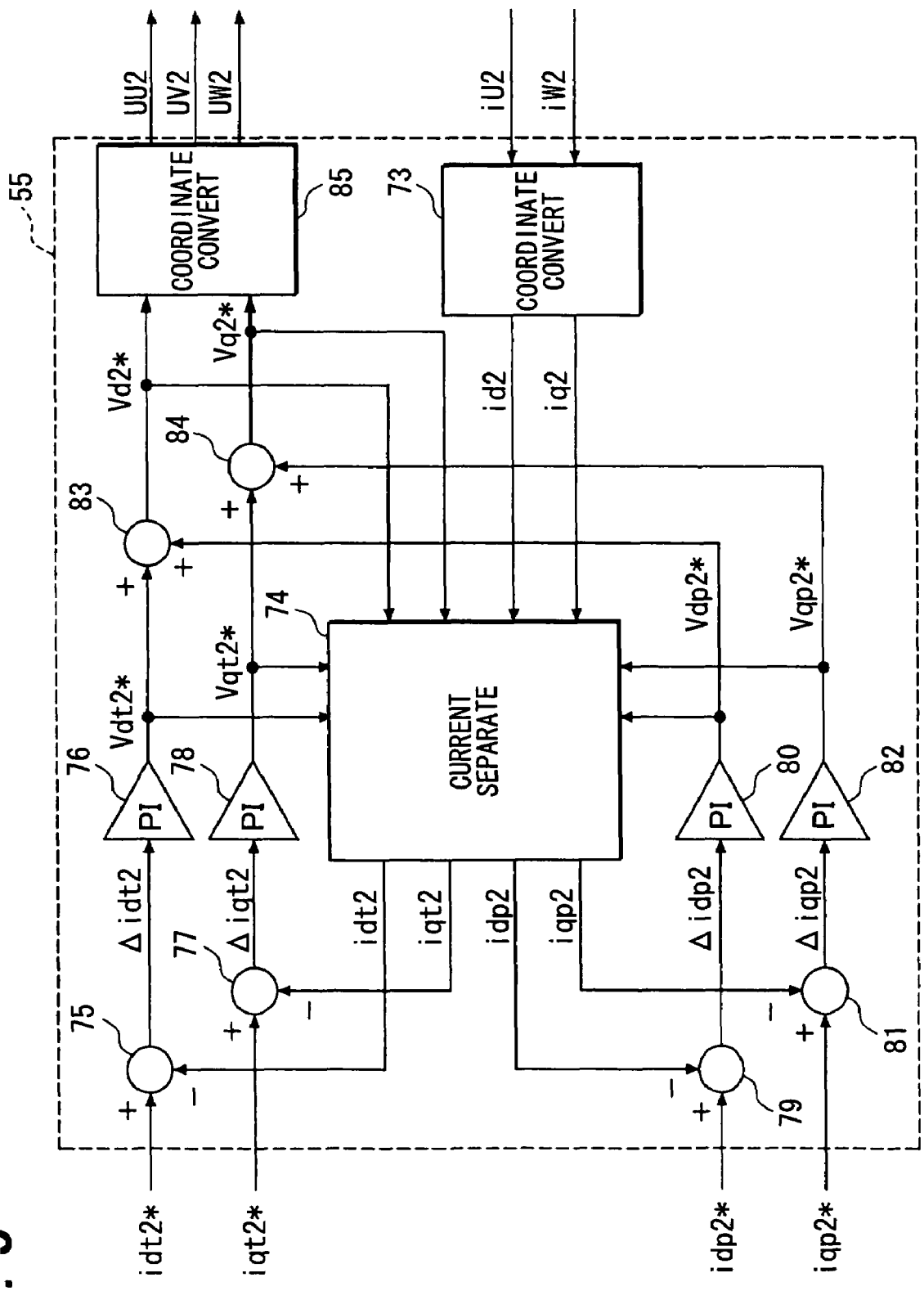
FIG. 9 is a block diagram illustrating a second current control unit.

Thereafter, the command current vector it2* (d-axis command current idt2*, q-axis command current iqt2*) for controlling the torque and the command current vector ip2*(d-axis command current idp2*, q-axis command current iqp2*) for controlling the input electric power, are input to a second current control unit 55 (current control means). This second current control unit is shown in FIG. 9. In this second current control unit 55, a coordinate converter unit 73 computes a motor detection current vector i2 (d-axis motor detection current id2, q-axis motor detection current iq2) which is a detection value of current actually flowing into the second AC motor 14 based on the currents iU2 and iW2 of U-phase and W-phase of the second AC motor 14 (output signals of the current sensors 43 and 44) and on the rotational position θ2 of the rotor of the second AC motor 14 (output signal of the rotor rotational position sensor 40).

Thereafter, in order to control the torque of the second AC motor 14 and to control the electric input power to the second AC motor 14 independently from each other, a current separation unit 74 (current separation means) separates the detected motor current vector i2 (d-axis detected motor current id2, q-axis detected motor current iq2) into a detected current vector it2 (d-axis detected current idt2, q-axis detected current iqt2) for controlling the torque related to the torque control and a detected current vector ip2 (d-axis detected current idp2, q-axis detected current iqp2) for controlling the input electric power related to the input electric power control.

Figure 10:
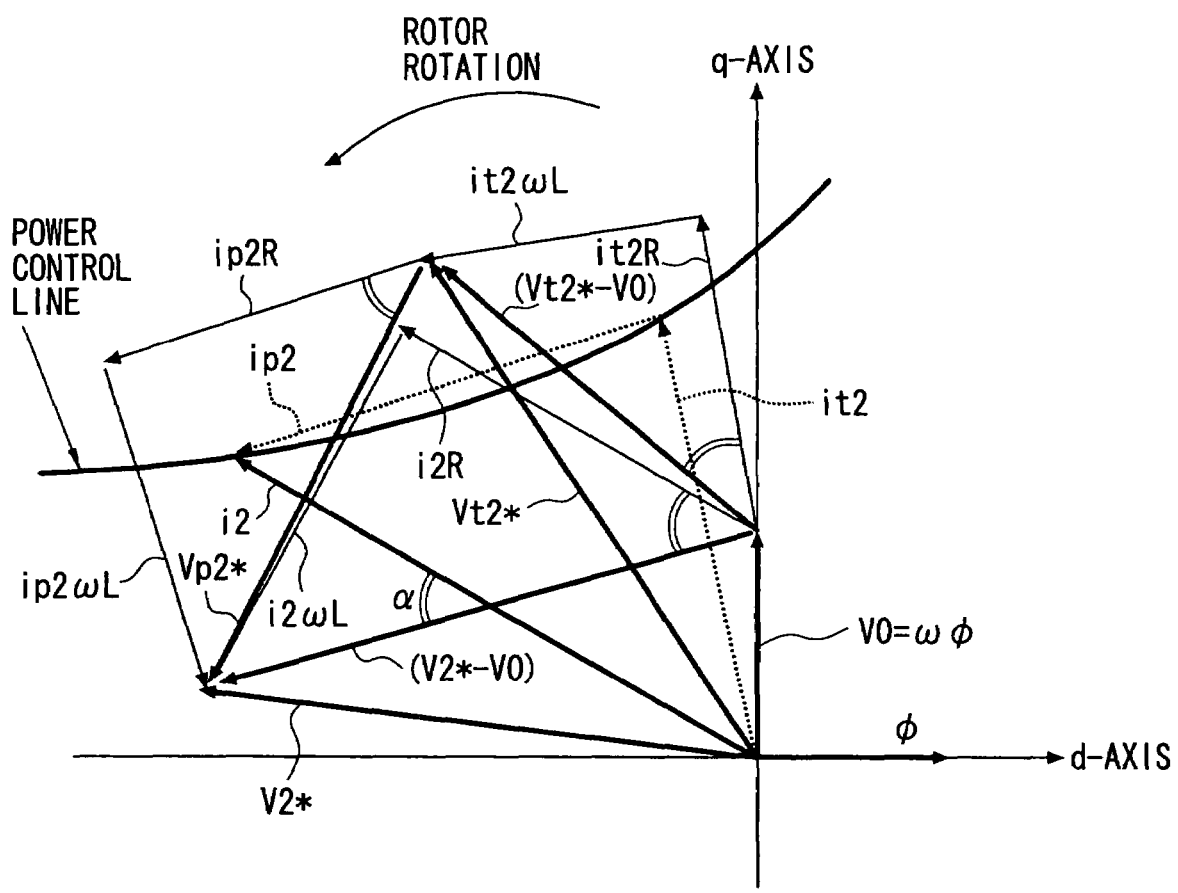
FIG. 10 is a diagram illustrating a method of calculating a detected current vector it2 for controlling the torque and a detected current vector ip2 for controlling the input electric power.

FIG. 10 shows a method of separating the detected motor current vector i2 into the detected current vector it2 for controlling the torque and the detected current vector ip2 for controlling the input electric power. Here, ω denotes an electric angular velocity, L denotes an inductance, R denotes an armature winding resistance and $\phi$ denotes an interlinking magnetic flux. The motor command voltage vector V2* is a voltage vector obtained by adding the command voltage vector Vp2* for controlling the input electric power to the command voltage vector Vt2 for controlling the torque, and the voltage vector V0 is a voltage vector computed by multiplying the electric angular velocity ω by the magnetic flux linkage $\phi$.

At a moment when the phase difference is a between the voltage vector (V2*−V0) and the current vector i2, and R and ωL are not almost changing, a triangle A formed by the three current vectors i2, it2 and ip2 is similar to a triangle B formed by the three voltage vectors (V2*−V0), (Vt2*−V0) and Vp2*. Therefore, the similarity ratio R of the triangle A by the current vectors to the triangle B by the voltage vectors becomes a value obtained by dividing the length of the current vector i2 by the length of the voltage vector (V2*−V0), $$R = |i2| / |V2^* - V0|$$

That is, the triangle A formed by the three current vectors i2, it2 and ip2 is a triangle which works to advance the angle by α in the direction of each side of the triangle B formed by the three voltage vectors (V2*−V0), (Vt2*−V0) and Vp2*, and to lengthen each side by R times.

It is, therefore, possible to compute the detected current vector it2 (d-axis detected current idt2, q-axis detected current iqt2) for controlling the torque by computing a vector that advances the angle by a in the direction of the voltage vector (Vt2*−V0) and lengthens the length thereof by R times. It is, further, possible to compute the detected current vector ip2 (d-axis detected current idp2, q-axis detected current iqp2) for controlling the input electric power by finding a vector that advances the angle by a in the direction of the voltage vector Vp2* and lengthens the length thereof by R times.

After the detected motor current vector i2 is separated into the detected current vector it2 for controlling the torque and the detected current vector ip2 for controlling the input electric power, as shown in FIG. 9, a subtractor 75 computes a difference Δidt2 between the d-axis command current idt2* for controlling the torque and the d-axis detected current idt2. The difference Δidt2 is input to a P-I control unit 76 which computes a d-axis command voltage Vdt2* for controlling the torque by the P-I control so that the difference Δidt2 decreases. Further, a subtractor 77 computes a difference Δiqt2 between the q-axis command current iqt2* for controlling the torque and the q-axis detected current iqt2, and the difference Δiqt2 is input to a P-I control unit 78 which computes a q-axis command voltage Vqt2* for controlling the torque by the P-I control so that the difference Δiqt2 decreases. Thus, a command voltage vector Vt2* (d-axis command voltage Vdt2*, q-axis command voltage Vqt2*) for controlling the torque is computed to decrease the difference between the command current vector it2* for controlling the torque and the detected current vector it2.

Further, a subtractor 79 computes a difference Δidp2 between the d-axis command current idp2* for controlling the input electric power and the d-axis detected current idp2, and the difference Δidp2 is input to a P-I control unit 80 which computes a d-axis command voltage Vdp2* for controlling the input electric power by the P-I control so that the difference Δidp2 decreases. Further, a subtractor 81 computes a difference Δiqp2 between the q-axis command current iqp2* for controlling the input electric power and the q-axis detected current iqp2, and the difference Δiqp2 is input to a P-I control unit 82 which computes a q-axis command voltage Vqp2* for controlling the input electric power by the P-I control so that the difference Δiqp2 decreases. Thus, a command voltage vector Vp2* (d-axis command voltage Vdp2*, q-axis command voltage Vqp2*) for controlling the input power is computed to decrease the difference between the command current vector ip2* for controlling the input electric power and the detected current vector ip2.

As described above, the command voltage vector Vt2* (d-axis command voltage Vdt2*, q-axis command voltage Vqt2*) for controlling the torque and the command voltage vector Vp2* (d-axis command voltage Vdp2*, q-axis command voltage Vqp2*) for controlling the input electric power, are independently computed. Thereafter, an adder 83 adds the d-axis command voltage Vdp2* for controlling the input electric power to the d-axis command voltage Vdt2* for controlling the torque to compute a final d-axis motor command voltage Vd2*. An adder 84 adds the q-axis command voltage Vqp2* for controlling the input electric power to the q-axis command voltage Vqt2* for controlling the torque to compute a final motor q-axis command voltage vector Vq2*. Thus, the motor command voltage vector V2* (d-axis motor command voltage Vd2, q-axis motor command voltage Vq2*) is determined. V2* (d-axis motor command voltage Vd2, q-axis motor command voltage Vq2*) is converted through a coordinate converter unit 85 into three-phase voltage command signals UU2, UV2 and UW2, which are output to a second inverter 28 of these three-phase voltage command signals UU2, UV2 and UW2.

As described above, the system voltage stabilization control is executed to suppress variation in the system voltage by executing the torque control to control the torque of the second AC motor 14 so as to realize the torque command value T2* output from the main control unit 31, by executing the input electric power control to vary the electric power (reactive power) input to the second AC motor 14 by the input electric power operation amount Pm while maintaining the torque of the second AC motor 14 (torque command value T2*) constant, and by so controlling the electric input power (reactive power) to the second MG unit 30 (second AC motor 14) that the difference ΔVs decreases between the target value Vs* of the system voltage and the detection value Vsf. In this case, the P-I controller 53, the input electric power control current computation unit 54 and the like units operates as system voltage control means.

(Conversion Voltage Control)

Right after the start of system operation but before completion of pre-charging the smoothing capacitor 24, the motor control unit 37 executes the conversion voltage control to control the output voltage of the voltage boosting converter 21 so as to decrease the difference ΔVs between the target value Vs* and the detection value Vsf of the system voltage.

Specifically, as shown in FIG. 3, the system voltage target value computation unit 50 computes the target value Vs* of the system voltage, the system voltage Vs detected by the voltage sensor 25 is input to the first low pass filter 51 to execute the low pass filtering process permitting the passage of components in a low-frequency region only of the detected system voltage Vs. Thereafter, a subtractor 68 computes the difference ΔVs between the target value Vs* of the system voltage and the detection value Vsf of the system voltage after being subjected to the low pass filtering. The difference ΔVs is input to a P-I control unit 69 (conversion voltage control quantity computing means), and a current duty ratio Dvc of a switching element (not shown) in the voltage boosting converter 21 is computed by P-I control so as to decrease the difference ΔVs between the target value Vs* of the system voltage and the detection value Vsf of the system voltage after being subjected to the low pass filtering.

The current duty ratio Dvc for voltage control and the current duty ratio Dpc for power control that will be described later are input to a voltage boosting drive selection and computation unit 70, which operates as a selector means. After the start of the system, the voltage boosting drive selection and computation unit 70 determines whether the ready signal from the main control unit 31 has been received. When it is determined that the ready signal has not been received, it is so determined that the smoothing capacitor 24 has not yet been sufficiently pre-charged, and the current duty ratio Dvc for voltage control is selected as a current duty ratio Dc of the switching element in the voltage boosting converter 21 to thereby execute the conversion voltage control by the voltage boosting converter 21.

Dc=Dvc

Thereafter, a voltage boosting drive signal computation unit 71 computes voltage boosting drive signals UCU, UCL based on the current duty ratio Dc (=Dvc) for power control, and the voltage boosting drive signals UCU and UCL are output to the voltage boosting converter 21.

Right after the start of system operation but before the smoothing capacitor 24 has been sufficiently pre-charged, the conversion voltage control is executed to control the output voltage of the voltage boosting converter 21 so as to decrease the difference ΔVs between the target value Vs* and the detection value Vsf of the system voltage. The smoothing capacitor 24 is, thereafter, sufficiently pre-charged so that the system voltage is quickly controlled to become the target value. During this conversion voltage control, the system voltage control (system voltage stabilization control) by operating the input power of the second MG unit 30 is inhibited. As a result, interference between the system voltage control (system voltage stabilization control) and the system voltage control (conversion voltage control) is restricted. In this case, the P-I control unit 69, the voltage boosting drive selection and computation unit 70 and the voltage boosting drive signal computation unit 71 operate as a conversion voltage control means.

(Conversion Power Control)

After the start of system operation and the smoothing capacitor 24 has been sufficiently pre-charged, the motor control unit 37 halts the above conversion voltage control, and changes the operation over to conversion power control to control the output voltage of the voltage boosting converter 21 so as to decrease the difference ΔPi between the command value Pif* and the detection value Pi of electric power output by the boosting converter 21.

When the command value Pif* of electric power output from the boosting converter 21 is to be computed, first, the torque command value T1* and the rotational speed N1 of the first AC motor 13 are input to a first shaft output computation unit 56 to compute a shaft output PD1 of the first AC motor 13 as shown in FIG. 3. Further, the torque command value T1* and the rotational speed N1 of the first AC motor 13 are input to a first output loss computation unit 57 to compute an output loss PL1 of the first AC motor 13. Thereafter, an adder 58 adds the output loss PL1 to the shaft output PD1 of the first AC motor 13 to compute an input power Pi1 to the first AC motor 13. In this case, when the first AC motor 13 is operating as a generator, the computation result of input power Pi1 to the first AC motor 13 assumes a negative value.

Further, the torque command value T2* and the rotational speed N2 of the second AC motor 14 are input to a second shaft output computation unit 59 to compute a shaft output PD2 of the second AC motor 14. Further, the torque command value T2* and the rotational speed N2 of the second AC motor 14 are input to a second output loss computation unit 60 to compute an output loss PL2 of the second AC motor 14. Thereafter, an adder 61 adds the output loss PL2 to the shaft output PD2 of the second AC motor 14 to compute an input power Pi2 to the second AC motor 14. In this case, when the second AC motor 14 is operating as a generator, the computation result of input power Pi2 to the second AC motor 14 assumes a negative value.

Thereafter, the input power Pi1 to the first AC motor 13 and the input power Pi2 to the second AC motor 14 are added up together through an adder 62 to compute a total electric power Pi*. The total electric power Pi* is input to a second low pass filter 63 (second low frequency component passing means) so as to be subjected to the low pass filtering process permitting the passage of components in a low-frequency region only of the total electric power Pi*. The total electric power Pif* after being subjected to the low pass filtering is regarded to be the command value Pif* of the output power. The adder 62 and the second low pass filter 63, etc. operate as conversion power command value computation means.

Further, when a conversion power operation amount correction value Pmc is output from the power operation amount distribution controller 86, an adder 87 adds the conversion power operation amount correction value Pmc to the output power command value Pif* (resultant power Pif* after the processing through the low-pass filtering), and the final output power command value Pif* (Pif*=Pif*+Pmc) is found in order to alternatively operate the conversion power operation amount correction value Pmc by the conversion electric power control.

When the detection value Pi of electric power output from the voltage boosting converter 21 is to be computed, the detection value ic of current output from the voltage boosting converter 21 detected by the current sensor 26 is input to a third low pass filter 64 (third low frequency component passing means) and is subjected to the low pass filtering process permitting the components in the low-frequency region only to pass through in the detection value ic of current output from the voltage boosting converter 21. A conversion power detection unit 65 multiplies the target value Vs* of the system voltage by the detection value icf of current output from the voltage boosting converter 21 after having been subjected to the low pass filtering in order to compute the detection value Pi of the conversion power. The detection value Vsf of the system voltage may be multiplied by the detection value icf of the output current to compute the detection value Pi of the output power.

Thereafter, a difference ΔPi between the command value Pif* and the detection value Pi of electric power output from the voltage boosting converter 21 is computed by a subtractor 66. The difference ΔPi is input to a P-I control unit 67 (conversion power control amount computation means), and a current duty ratio Dpc of a switching element (not shown) in the voltage boosting converter 21 is computed by P-I control so as to decrease the difference ΔPi between the command value Pif* and the detection value Pi of electric power output from the voltage boosting converter 21.

The current duty ratio Dpc for power control and the current duty ratio Dvc for voltage control are input to the voltage boosting drive selection and computation unit 70, which operates as a selection means. The voltage boosting drive selection and computation unit 70 determines if the ready signal from the main control unit 31 has been received after the start of the system. When it is determined that the ready signal has been received already, it is so determined that the smoothing capacitor 24 has been pre-charged, and the current duty ratio Dpc for power control is selected as a current duty ratio Dc for the switching element in the voltage boosting converter 21 so as to execute the conversion power control by the voltage boosting converter 21.

$$Dc=Dpc$$

Thereafter, based on the current duty ratio Dc(=Dpc) for power control, the voltage boosting drive signal computation unit 71 computes voltage boosting drive signals UCU and UCL, and outputs the voltage boosting drive signals UCU and UCL to the voltage boosting converter 21.

After the smoothing capacitor 24 has been pre-charged as described above, the conversion power control is executed to control the electric power output from the voltage boosting converter 21 so as to decrease the difference ΔPi between the command value Pif* and the detection value Pi of electric power output from the voltage boosting converter 21. Thus, the electric power supplied to the power line 22 by the voltage boosting converter 21 can be controlled as desired. In this case, the P-I control unit 67, the voltage boosting drive selection and computation unit 70 and the voltage boosting drive signal computation unit 71 operate as a conversion power control means.

Figure 11:
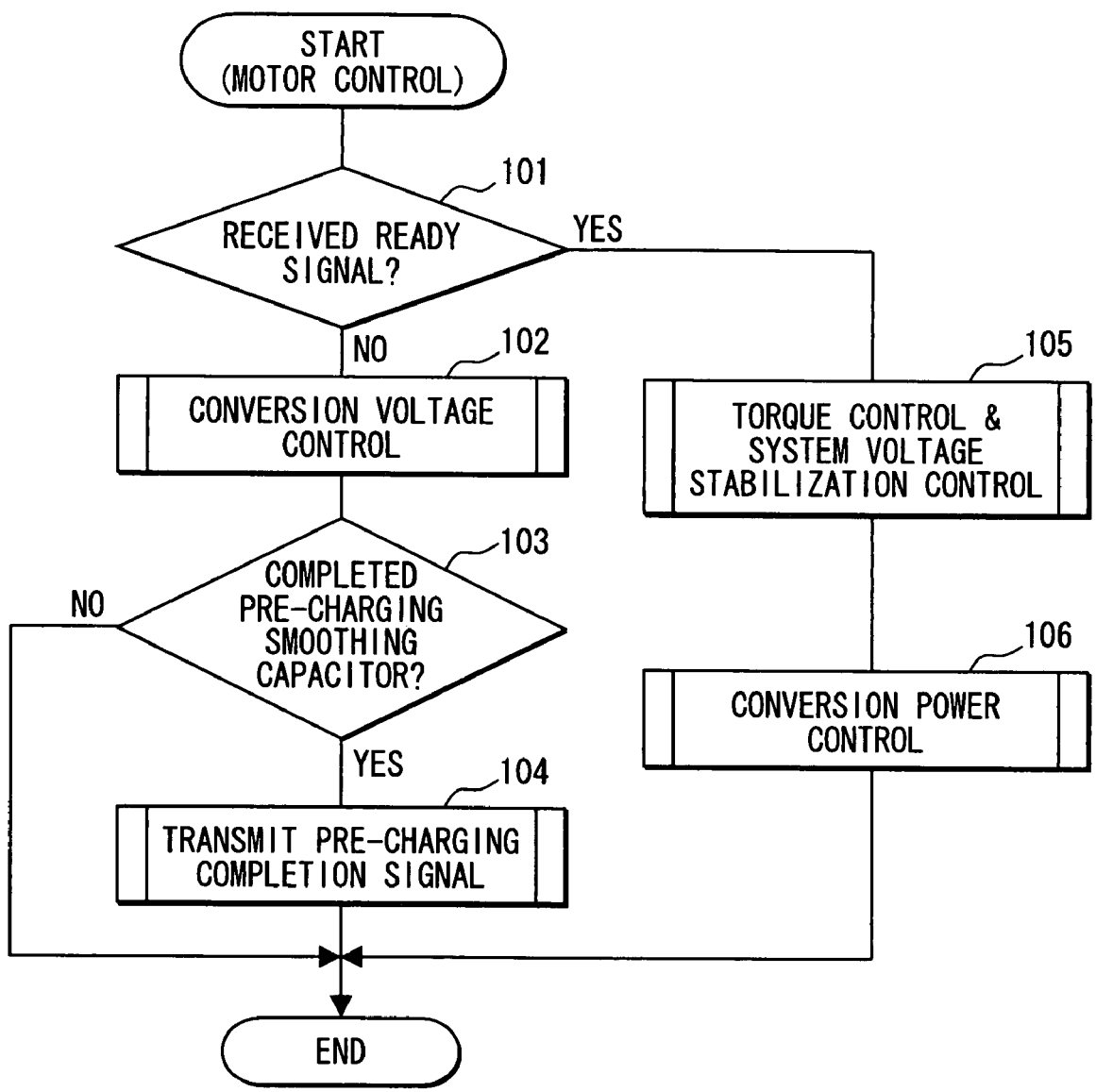
FIG. 11 is a flowchart illustrating processing of a motor control main program.

The above motor control (torque control, system voltage stabilization control), conversion voltage control and conversion power control are executed according to a main motor control program shown in FIG. 11. This program is repetitively executed at a predetermined interval after the start of system operation. When the program starts, it is determined at step 101, first, if the ready signal is received from the main control unit 31. When it is determined that the ready signal has not been received, it is so determined that the smoothing capacitor 24 has not been sufficiently pre-charged yet. The routine proceeds to step 102, where the conversion voltage control is executed to so control the output voltage of the voltage boosting converter 21 that the difference ΔVs between the target value Vs* and the detection value Vsf of the system voltage decreases. As a result, the smoothing capacitor 24 is pre-charged to quickly control the system voltage so as to assume the target value. While the conversion voltage control at step 102 is being executed, the system voltage control (system voltage stabilization control at step 105) by computing the input power to the second MG unit 30 is inhibited.

The routine, thereafter, proceeds to step 103 to determine whether the smoothing capacitor 24 has been sufficiently pre-charged. When it is determined that the pre-charging the smoothing capacitor 24 has been completed (sufficiently pre-charged), the routine proceeds to step 104 where a pre-charge completion signal is transmitted to the main control unit 31.

When it is determined based on the pre-charge completion signal or other signals that the motor control system needs no longer be placed in the shut-down state, the main control unit 31 transmits the ready signal to the motor control unit 37.

Thereafter, when it is determined at step 101 that the ready signal is received from the main control unit 31, it is so determined that the smoothing capacitor 24 has been sufficiently pre-charged. The routine then proceeds to step 105 where the motor control system is no longer placed in the shut-down state, and the motor control (torque control, system voltage stabilization control) is executed. At step 106, the conversion voltage control is changed over to the conversion power control, and the output power of the voltage boosting converter 21 is so controlled as to decrease the difference ΔPi between the command value Pif* and the detection value Pi of the electric power output from the voltage boosting converter 21.

According to the above embodiment, the input power to the second MG unit 30 (second AC motor 14) is so controlled that the difference ΔVs decreases between the target value Vs* and the detection value Vsf of the system voltage to execute the system voltage stabilization control in order to suppress variation in the system voltage of the power supply line 22. Therefore, even when the power balance greatly varies between the two AC motors 13 and 14 due to changes in the operating conditions of the vehicle, the system voltage can be effectively stabilized. Besides, the voltage of the power supply line 22 can be highly stabilized without using the voltage boosting converter 21 of high performance or without using the smoothing capacitor 24 of a large capacity, satisfying the requirement of realizing the system in a small size and at a decreased cost.

In this embodiment, further, the detected motor current vector i2 is separated into a detected current vector it2 for controlling the torque and the detected current vector ip2 for controlling the input electric power, the command voltage vector Vt2* is computed for controlling the torque so that the difference decreases between the command current vector it2* for controlling the torque and the detected current vector it2, and the command voltage vector Vp2* is computed for controlling the input electric power so that the difference decreases between the command current vector ip2* for controlling the input electric power and the detected current vector ip2. Then, the command voltage vector Vt2* for controlling the torque and the command voltage vector Vp2* for controlling the input electric power are computed independently from each other. The final motor command voltage is computed based upon the command voltage vector Vt2* for controlling the torque and on the command voltage vector Vp2* for controlling the input electric power to thereby control the torque of the second AC motor 14 and the electric input power to the second MG unit 30 independently from each other. This prevents the interference between controlling the torque of the second AC motor 14 and controlling the electric input power to the second MG unit 30, and helps stabilize the torque control for the second AC motor 14 and the input electric power control for the second MG unit 30.

In this embodiment, further, right after the start of system operation but before the smoothing capacitor 24 has been sufficiently pre-charged, the conversion voltage control is executed to so control the output voltage of the voltage boosting converter 21 that the difference ΔVs decreases between the target value Vs* and the detection value Vsf of the system voltage. The smoothing capacitor 24 is, thereafter, precharged to quickly control the system voltage so as to assume the desired value. Besides, the power command value (target power operation amount Pm) for stabilizing the system voltage is inhibited from being instructed to the motor control to thereby inhibit the execution of the system voltage stabilization control. Next, after the smoothing capacitor 24 has been pre-charged, the motor control system is no longer placed in the shut-down state, and the motor control system is released from the shut-down state. Thus, the motor control (torque control, system voltage stabilization control) is started, and the conversion voltage control is changed over to the conversion power control. As a result, the output power of the voltage boosting converter 21 is so controlled that the difference ΔPi decreases between the command value Pif* and the detection value Pi of the electric power output from the voltage boosting converter 21. Thus, the conversion voltage control and the conversion power control are changed over depending upon the conditions of the vehicle. Besides, when the conversion voltage control is being executed, execution of the system voltage stabilization control is inhibited. Therefore, the system voltage can be effectively stabilized without being affected by the conditions of the vehicle.

In this embodiment, further, at the time of executing the system voltage stabilization control, the current vector is so controlled as to vary the reactive power only that does not contribute to producing the torque of the second AC motor 14, in order to control the system voltage by controlling the input power to the second MG unit 30 (second AC motor 14) while holding the torque of the second AC motor 14 nearly constant (torque command value T2*). Therefore, variation in the system voltage is suppressed without adversely affecting the operating condition of the vehicle.

In this embodiment, further, the target power operation amount Pm in the system voltage stabilization control is distributed to the MG power operation amount command value Pm2 and to the conversion power operation amount correction value Pmc, the input power (reactive power) to the second MG unit 30 is controlled by using the distributed MG power operation amount command value Pm2 and the output power of the voltage boosting converter 21 is controlled by using the distributed conversion power operation amount correction value Pmc. Therefore, even if the target power operation amount Pm necessary for stabilizing the system voltage exceeds the limit MG power control amount Pm2(max) at the time when the system voltage becomes very smaller than the target value decreasing the reactive power of the second MG unit 30, the target power operation amount Pm is obtained by being shared by both the second MG unit 30 and the voltage boosting converter 21, and the system voltage quickly gets out of the excessively decreased state and is stabilized.

Besides, in this embodiment, if the target power operation amount Pm exceeds the limit MG power control amount Pm2(max), an excess amount of the target power operation amount Pm over the limit MG power control amount Pm2(max) or a value slightly greater than the above amount is set as the conversion power operation amount correction value Pmc, and a value obtained by subtracting the conversion power operation amount correction value Pmc from the target power operation amount Pm is set as the MG power operation amount command value Pm2. Therefore, if the target power operation amount Pm exceeds the limit MG power control amount Pm2(max), the target power operation amount Pm is distributed to the MG power operation amount command value Pm2 and to the conversion power operation amount correction value Pmc so that the MG power operation amount command value Pm2 will not exceed the limit MG power control amount Pm2(max).

On the other hand, if the target power operation amount Pm exceeds the limit conversion power control amount Pmc(max), an excess amount of the target power operation amount Pm over the limit conversion power control amount Pmc(max) or a value slightly greater than the above amount is set as the MG power operation amount command value Pm2, and a value obtained by subtracting the MG power operation amount command value Pm2 from the target power operation amount Pm is set as the conversion power operation amount correction value Pmc. Therefore, even if the target power operation amount Pm exceeds the limit conversion power control amount Pmc(max), the target power operation amount Pm is distributed to the MG power operation amount command value Pm2 and to the conversion power operation amount correction value Pmc so that the conversion power operation amount correction value Pmc will not exceed the limit conversion power control amount Pmc(max).

In this embodiment, further, the target power operation amount Pm is calculated by using the detected system voltage value Vsf after having been processed though the low pass filter. Therefore, the target power operation amount Pm can be operated by using the detected system voltage Vsf after the noise components (high frequency components) contained in the detected system voltage Vs have been removed through the low pass filter processing improving precision for calculating the target power operation amount Pm.

According to this embodiment, the command value Pif* for the conversion power is computed from the total electric power Pi* obtained by adding up the power Pi1 input to the first AC motor 13 and the power Pi2 input to the second AC motor. Further, the target value Vs* (or detection value Vsf) of the system voltage is multiplied by the detection value icf of the current output from the voltage boosting converter 21 to compute the detection value Pi of the conversion power. Further, the electric power output from the voltage boosting converter 21 is so controlled as to decrease the difference ΔPi between the command value Pif* and the detection value Pi of the conversion electric power. When the conversion power control is to be executed, the system voltage control (system voltage stabilization control) by operating the electric input power to the second MG unit 30 is inhibited. Thus, the electric power supplied to the power supply line 22 can be controlled as desired, the system voltage can be stabilized, reducing the burden on the conversion of power caused by the system voltage control (system voltage stabilization control) by operating the electric input power to the second MG unit 30.

In this embodiment, further, the total power Pif* after the total power Pi* of power Pi1 input to the first AC motor 13 and power Pi2 input to the second AC motor is subjected to the low pass filtering process, is used as the command value Pif* for the conversion power. Therefore, the total electric power Pif* after the noise components (high-frequency components) are removed by low pass filtering can be used as the command value Pif* for the conversion power, making it possible to accurately set the command value Pif* for the conversion power. Besides, upon limiting the frequency band, the voltage boosting converter 21 can be prevented from operating at high speeds, and the voltage boosting converter 21 of low performance having a small size can be used, which is advantageous for being mounted on a vehicle.

In this embodiment, further, the detection value Pi of conversion power is operated by using the detection value icf of current output from the voltage boosting converter 21 after having been subjected to the low pass filtering. In computing the detection value Pi of conversion power, therefore, there can be used the detection value icf of output current after noise components (high-frequency components) included in the detection value ic of output current have been removed by low pass filtering to improve accuracy for operating the detection value Pi of conversion power.

At the start of the electric vehicle, further, the system voltage, usually, starts with zero. A predetermined target voltage must be attained to complete the start. In this case, the MG unit 30 has been shut down in the initial stage of start, and the system voltage stabilization cannot be executed by using the MG unit 30. To cope with this, at the start of the electric vehicle, this embodiment does not execute the conversion power control but executes the conversion voltage control, instead, while inhibiting the system voltage control (system voltage stabilization control) which is based on operating the electric input power to the MG unit 30. This prevents the system voltage control (system voltage stabilization control) based on the operation of input power to the MG unit 30 from interfering with the system voltage control (conversion power control) by the voltage boosting converter 21, and makes it possible to effectively stabilize the system voltage and to smoothly start the electric vehicle.

After the start of the electric vehicle, the MG unit 30 may often overheat due to abnormal condition in the cooling system while the electric vehicle is traveling. In this case, the MG unit 30 may often be shut down to protect the MG unit 30. In this case, therefore, the system voltage stabilization cannot be executed by using the MG unit 30.

To cope with this, therefore, in case the MG unit 30 overheats due to abnormal condition in the cooling system while the electric vehicle is traveling, this embodiment does not execute the conversion power control but executes the conversion voltage control, instead, while inhibiting the system voltage control (system voltage stabilization control) which is based on the operation of electric input power to the MG unit 30. Thus, the system voltage is controlled by controlling the voltage by using the voltage boosting converter 21, the system voltage is effectively stabilized, the system voltage is prevented from becoming excessive, and the MG unit 30 and the like are reliably protected.

In the above embodiment, the AC motors are controlled by the sinusoidal PWM control method. However, the system may control the AC motors based on any other control systems (e.g., rectangular wave control system).

In the above embodiment, further, the electric power output from the voltage boosting converter 21 is so controlled as to decrease the difference ΔPi between the command value Pif* and the detection value Pi of electric power output from the voltage boosting converter 21 at the time of controlling the conversion electric power. However, it is also possible to so control the electric input power to the voltage boosting converter 21 as to decrease the difference ΔPi between the command value Pif* and the detection value Pi of electric input power to the voltage boosting converter 21.

In the above embodiment, further, the electric input power to the second MG unit 30 (second AC motor 14) is controlled to suppress variation in the system voltage at the time of the system voltage stabilization control operation. However, variation in the system voltage may be suppressed by controlling the electric input power to the first MG unit 29 (first AC motor 13). Alternatively, in a vehicle of the all-wheel-drive configuration mounting a third MG unit on the driven wheels, variation in the system voltage may be suppressed by controlling the electric input power to the third MG unit.

The above embodiment is directed to a hybrid vehicle of the split type, which splits the motive power of the engine through a planetary gear set. Not being limited to the hybrid vehicle of the split type, however, the embodiment may be hybrid vehicles of other types, such as a parallel type and a series type. In the above embodiment, further, the vehicle uses the AC motor and the engine as motive power sources. However, the vehicle may use the AC motor only as a motive power source. The vehicle may have only one MG unit comprising an inverter and an AC motor, or three or more MG units.

What is claimed is:

1. A control apparatus for an electric vehicle comprising:
   conversion means that converts a voltage of a DC power supply into a system voltage of a power supply line;
   an MG unit that includes an inverter connected to the power supply line and an AC motor driven by the inverter;
   system voltage control means that executes a system voltage stabilization control to suppress variation in the system voltage by operating an electric power supplied to the power supply line;
   current control means that controls a torque of the AC motor and an electric input power to the MG unit independently from each other;
   conversion power control means that executes a conversion power control to control the electric input power to the conversion means or a conversion power as an output power of the conversion means;
   conversion voltage control means that executes a conversion voltage control to control an output voltage from the conversion means; and
   selection means that selects one of the conversion power control and the conversion voltage control, and inhibits the system voltage stabilization control when the conversion voltage control is selected,
   wherein the system voltage control means includes target power operation amount calculation means that calculates a target power operation amount as a target operation amount of the electric power supplied to the power supply line, and distribution means that distributes the target power operation amount to an MG power operation amount command value for controlling the MG unit and to a conversion power operation amount correction value for controlling the conversion power, wherein the conversion power control means controls the conversion power based on the conversion power operation amount correction value, and wherein the current control means controls the MG unit based on the MG power operation amount command value.

2. The control apparatus according to claim 1, wherein:

the system voltage control means includes target voltage setting means that sets a target value of the system voltage, and voltage detection means that detects the system voltage; and the target power operation amount calculation means calculates the target power operation amount based on a target value of the system voltage set by the target voltage setting means and on a detected system voltage of the power supply line.

3. The control apparatus according to claim 2, further comprising:

first low-pass means that permits only low frequency components of the detected system voltage lower than a predetermined frequency, wherein the target power operation amount calculation means calculates the target power operation amount based on the low frequency components of the system voltage.

4. The control apparatus according to claim 1, wherein:

the distribution means distributes the target power operation amount based on information of at least one of the MG unit and the vehicle.

5. The control apparatus according to claim 1, wherein:

the distribution means distributes the target power operation amount based on at least one of torque, rotational speed, electric power and temperature of the AC motor.

6. The control apparatus according to claim 1, wherein:

the distribution means distributes the target power operation amount based on at least one of a limit MG power control amount for the MG unit by the current control means and a limit conversion power control amount by the conversion power control means.

7. The control apparatus according to claim 6, wherein:

the distribution means uses, when the target power operation amount exceeds the limit MG power control amount, a value inclusive of an excess amount of the target power operation amount over the limit MG power control amount as the conversion power operation amount correction value, and a value obtained by subtracting the conversion power operation amount correction value from the target power operation amount as the MG power operation amount command value.

8. The control apparatus according to claim 6, wherein:

the distribution means uses, when the target power operation amount has exceeded the limit conversion power control amount a value inclusive of an excess amount of the target power operation amount over the limit conversion power control amount as the MG power operation amount command value, and a value obtained by subtracting the MG power operation amount command value from the target power operation amount as the conversion power operation amount correction value.

9. The control apparatus according to claim 1, wherein the conversion power control means includes:

conversion power command value calculation means that calculates a command value for the conversion power;

conversion power detection means that detects the conversion power; and conversion power control amount calculation means that calculates the conversion power control amount based on the command value for the conversion power, detection value of the conversion power detected by a conversion power detection means, and the conversion power operation amount correction value distributed by the distribution means, wherein the conversion power is controlled based on the conversion power control amount calculated by the conversion power control amount calculation means.

10. The control apparatus according to claim 9, wherein:

the conversion power command value calculation means calculates a command value for the conversion power based on an electric input power to all electric loads connected to the power supply line and inclusive of the MG unit.

11. The control apparatus according to claim 10, further comprising:

low-pass means that permits only low frequency components of the electric input power to the all electric loads lower than a predetermined frequency, wherein the conversion power command value calculation means calculates a command value for the conversion power based on the low frequency components of the electric input power.

12. The control apparatus according to claim 9, further comprising:

at least one of target voltage setting means that sets a target value of the system voltage or voltage detection means for detecting the system voltage; and current detection means for detecting an output current of the conversion means, wherein the conversion power detection means calculates the detection value of the conversion power based on the target value of the system voltage set by the target voltage setting means or the system voltage detected by the voltage detection means and the output current of the conversion means detected by the current detection means.

13. The control apparatus according to claim 12, further comprising:

low-pass means that permits only low frequency components of the output current of the conversion means detected by the current detection means and lower than a predetermined frequency, wherein the conversion power detection means calculates the detection value of the conversion power based on the low frequency components of the output current of the output current.

* * * * *